(12) United States Patent
Liu et al.

(10) Patent No.: US 12,135,849 B2
(45) Date of Patent: Nov. 5, 2024

(54) TOUCH DISPLAY SUBSTRATE AND DRIVING METHOD THEREFOR, AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Peng Liu, Beijing (CN); Peirong Huo, Beijing (CN); Hong Liu, Beijing (CN); Chao Liang, Beijing (CN); Aiyu Ding, Beijing (CN); Zhenhong Xiao, Beijing (CN); Yongqiang Zhang, Beijing (CN); Yusheng Liu, Beijing (CN); Jingyi Xu, Beijing (CN); Jiantao Liu, Beijing (CN); Bo Li, Beijing (CN)

(73) Assignees: ORDOS YUANSHENG OPTOELECTRONICS CO. LTD., Inner Mongolia (CN); BOE TECHNOLOGY GROUP CO, LTD., Beijing (CN)

( * ) Notice: Subject to any disclaimer, the term of this patent is extended or adjusted under 35 U.S.C. 154(b) by 143 days.

(21) Appl. No.: 17/789,243

(22) PCT Filed: Aug. 4, 2021

(86) PCT No.: PCT/CN2021/110655
§ 371 (c)(1),
(2) Date: Jun. 27, 2022

(87) PCT Pub. No.: WO2022/068384
PCT Pub. Date: Apr. 7, 2022

(65) Prior Publication Data
US 2023/0043173 A1 Feb. 9, 2023

(30) Foreign Application Priority Data

Sep. 30, 2020 (CN) .......................... 202011059250.4

(51) Int. Cl.
G06F 3/041 (2006.01)

(52) U.S. Cl.
CPC ........ *G06F 3/04164* (2019.05); *G06F 3/0412* (2013.01)

(58) Field of Classification Search
None
See application file for complete search history.

(56) References Cited

U.S. PATENT DOCUMENTS

| | | | | |
|---|---|---|---|---|
| 10,936,130 B1 * | 3/2021 | Yang | ................... | G06F 3/04164 |
| 2012/0262414 A1 * | 10/2012 | Lai | ........................ | G06F 3/0443 |
| | | | | 345/174 |

(Continued)

FOREIGN PATENT DOCUMENTS

| CN | 104808862 A | 7/2015 |
|---|---|---|
| CN | 105572936 A | 5/2016 |

(Continued)

OTHER PUBLICATIONS

Mingxin Wang et al., Design of 5.5 in IGZO TFT FFS In-Cell touch panel, Chinese Journal of Liquid Crystals and Displays, vol. 32 No. 12, Dec. 2017, entire document.

(Continued)

*Primary Examiner* — Brian M Butcher
(74) *Attorney, Agent, or Firm* — Lippes Mathias LLP

(57) ABSTRACT

Provided is a touch display substrate. The touch display substrate includes a base substrate, including a display region and a non-display region; a plurality of touch electrodes disposed in the display region; and a plurality of signal transmission circuits, a plurality of first control lines, (Continued)

a plurality of second control lines, a target signal line, and a plurality of touch signal lines that are disposed in the non-display region.

18 Claims, 9 Drawing Sheets

(56) References Cited

U.S. PATENT DOCUMENTS

| | | |
|---|---|---|
| 2016/0334908 A1 | 11/2016 | Zhuang et al. |
| 2017/0075487 A1 | 3/2017 | Huang et al. |
| 2017/0344179 A1 | 11/2017 | Kim et al. |
| 2018/0039118 A1 | 2/2018 | Chen et al. |
| 2020/0168284 A1 | 5/2020 | Yu et al. |
| 2021/0223936 A1 | 7/2021 | Zhao et al. |

FOREIGN PATENT DOCUMENTS

| | | |
|---|---|---|
| CN | 206193729 U | 5/2017 |
| CN | 106843916 A | 6/2017 |
| CN | 107463295 A | 12/2017 |
| CN | 109256171 A | 1/2019 |
| CN | 109669292 A | 4/2019 |
| CN | 110688030 A | 1/2020 |
| CN | 110716665 A | 1/2020 |
| CN | 110764653 A | 2/2020 |

OTHER PUBLICATIONS

China National Intellectual Property Administration, Notification to grant patent right for invention of Chinese application No. 202011059250.4 issued on Sep. 20, 2023, which is foreign counterpart application of this US application.

* cited by examiner

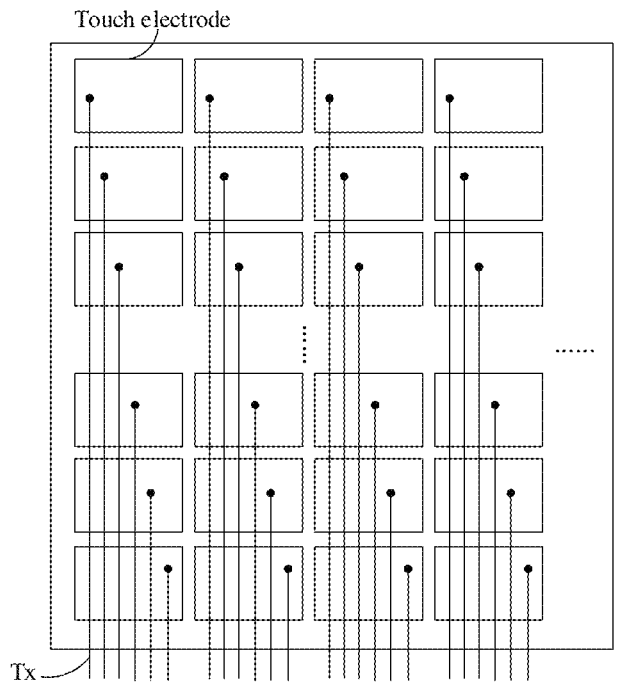
FIG. 1 (P.A.)
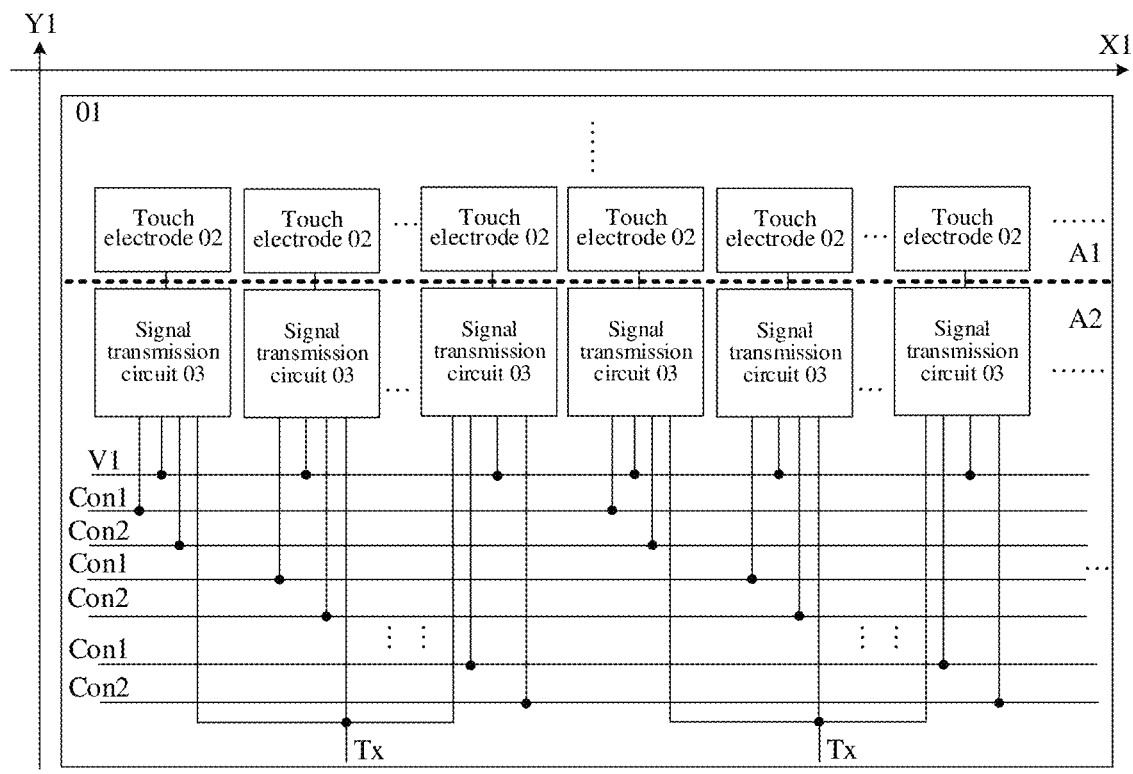
FIG. 2

In a display stage, each of first control lines and second control lines provides a control signal at an effective potential, and each signal transmission circuit controls a connected touch electrode and a connected target signal line to be conducted and the connected touch electrode and a connected touch signal line to be conducted in response to the control signal, wherein the target signal line and the touch signal line output common electrode signals to the touch electrode which is conducted with the target signal line and the touch signal line ⟶ 901

In an $i^{th}$ touch stage of n touch stages, in at least two signal transmission circuits connected to each touch signal line, a first control line connected to an $i^{th}$ signal transmission circuit provides a control signal at an effective potential, and a second control line connected to the $i^{th}$ signal transmission circuit provides a control signal at an ineffective potential; a second control line connected to another signal transmission circuit other than the $i^{th}$ signal transmission circuit provides a control signal at an effective potential, and a first control line connected to the another signal transmission circuit provides a control signal at an ineffective potential; and the $i^{th}$ signal transmission circuit controls a connected touch electrode and the connected target signal line to be conducted in response to the control signal at the effective potential provided by the first control line, wherein the target signal line outputs a touch modulation signal to the touch electrode conducted to the target signal line, and the another signal transmission circuit controls a connected touch electrode and a connected touch signal line to be conducted in response to the control signal at the effective potential provided by the second control line, wherein the touch signal line receives a touch signal fed back by the touch electrode conducted with the touch signal line ⟶ 902

FIG. 9

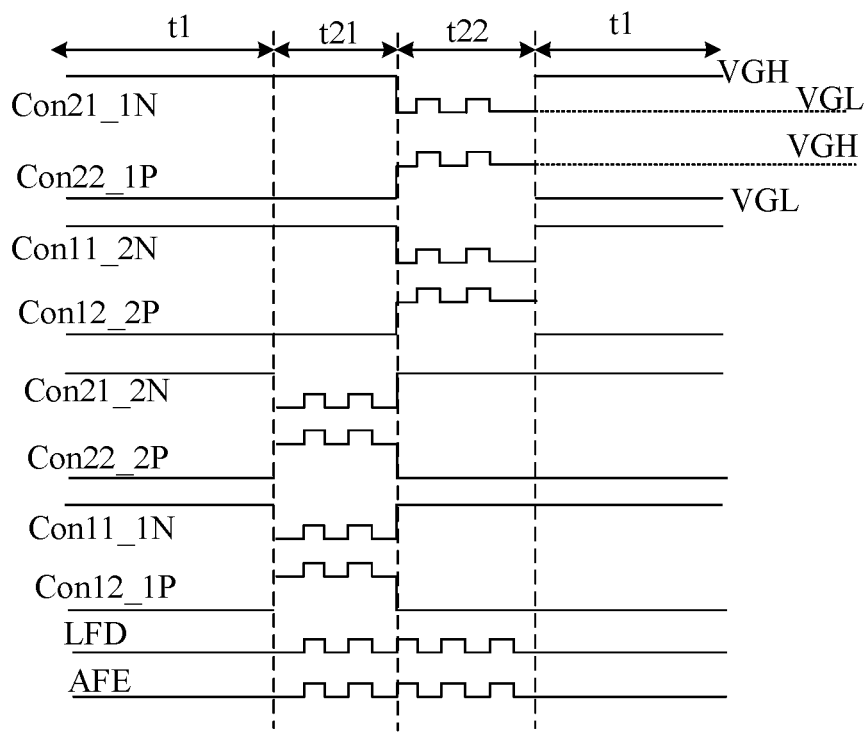

FIG. 10

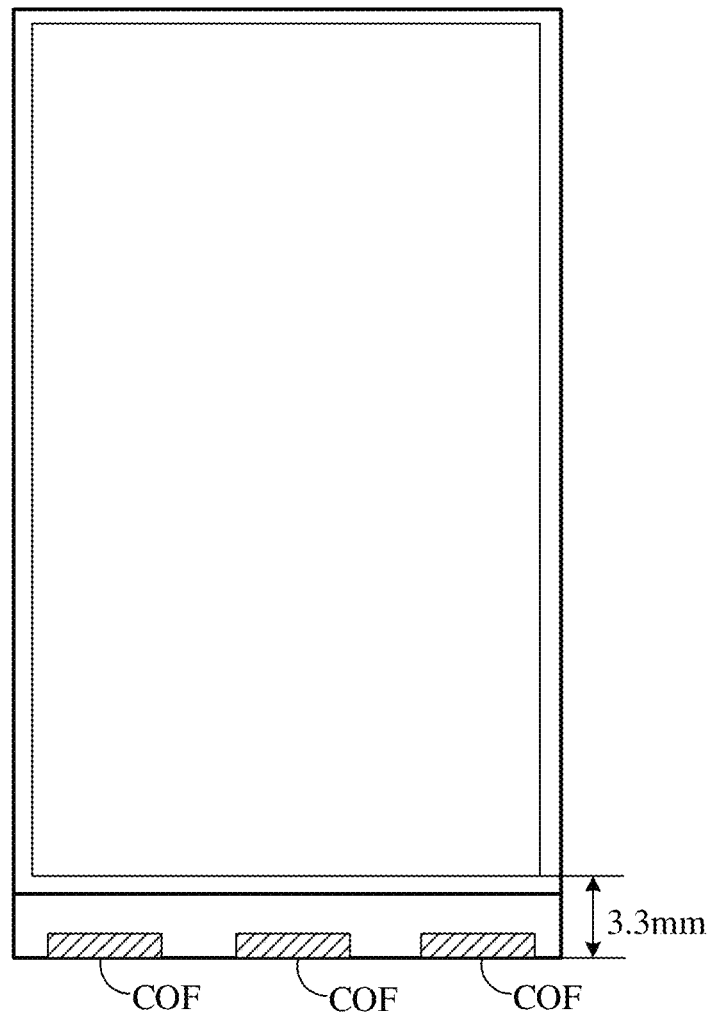
FIG. 13 (P.A.)

TOUCH DISPLAY SUBSTRATE AND DRIVING METHOD THEREFOR, AND DISPLAY DEVICE

CROSS-REFERENCE TO RELATED APPLICATION

This application is a 371 of PCT application No. PCT/CN2021/110655, filed on Aug. 4, 2021, which claims priority to Chinese Patent Application No. 202011059250.4, filed on Sep. 30, 2020 and entitled "TOUCH DISPLAY SUBSTRATE AND DRIVING METHOD THEREFOR, AND DISPLAY DEVICE," the contents which are incorporated herein by references in their entireties.

TECHNICAL FIELD

The present disclosure relates to the field of display technologies, and in particular relates to a touch display substrate and a driving method therefor, and a display device.

BACKGROUND

A touch display substrate is a display substrate which integrates touch and display driver (TTDI), which is also referred to as a TTDI display substrate.

SUMMARY

The present disclosure provides a touch display substrate and a driving method therefor, and a display device. The technical solutions are as follows.

In an aspect, a touch display substrate is provided. The touch display substrate includes:

a base substrate, including a display region and a non-display region;

a plurality of touch electrodes disposed in the display region; and a plurality of signal transmission circuits, a plurality of first control lines, a plurality of second control lines, a target signal line, and a plurality of touch signal lines that are disposed in the non-display region;

wherein each signal transmission circuit is connected to one first control line, one second control line, the target signal line, one touch signal line, and one touch electrode; and each signal transmission circuit is configured to control conduction/non-conduction between the touch electrode and the target signal line in response to a control signal provided by the first control line and control conduction/non-conduction between the touch electrode and the touch signal line in response to a control signal provided by the second control line; and at least two signal transmission circuits are connected to a same touch signal line, and in the at least two signal transmission circuits connected to the same touch signal line, any two signal transmission circuits are connected to different first control lines and are connected to different second control lines.

Optionally, each signal transmission circuit includes a first signal transmission sub-circuit and a second signal transmission sub-circuit; wherein the first signal transmission sub-circuit is connected to the first control line, the target signal line, and the touch electrode, and the first signal transmission sub-circuit is configured to control the conduction/non-conduction between the touch electrode and the target signal line in response to the control signal provided by the first control line; and the second signal transmission sub-circuit is connected to the second control line, the touch signal line, and the touch electrode, and the second signal transmission sub-circuit is configured to control the conduction/non-conduction between the touch electrode and the touch signal line in response to the control signal provided by the second control line.

Optionally, the first signal transmission sub-circuit includes a first signal transmission unit and a second signal transmission unit; and the first control line includes a first sub-control line and a second sub-control line; wherein the first signal transmission unit is connected to the first sub-control line, the target signal line, and one touch electrode, and the first signal transmission unit is configured to control the conduction/non-conduction between the touch electrode and the target signal line in response to a first control signal provided by the first sub-control line; and the second signal transmission unit is connected to the second sub-control line, the target signal line, and one touch electrode, and the second signal transmission unit is configured to control the conduction/non-conduction between the touch electrode and the target signal line in response to a second control signal provided by the second sub-control line;

wherein the first control signal and the second control signal are complementary.

Optionally, the first signal transmission unit includes a first N-type transistor; and the second signal transmission unit includes a first P-type transistor; wherein a gate of the first N-type transistor is connected to the first sub-control line, and a gate of the first P-type transistor is connected to the second sub-control line;

a first electrode of the first N-type transistor and a first electrode of the first P-type transistor are both connected to the target signal line, and a second electrode of the first N-type transistor and a second electrode of the first P-type transistor are both connected to one touch electrode.

Optionally, the second signal transmission sub-circuit includes a third signal transmission unit and a fourth signal transmission unit; and the second control line includes a third sub-control line and a fourth sub-control line; wherein the third signal transmission unit is connected to the third sub-control line, the touch signal line, and one touch electrode, and the third signal transmission unit is configured to control the conduction/non-conduction between the touch electrode and the touch signal line in response to a third control signal provided by the third sub-control line; and the fourth signal transmission unit is connected to the fourth sub-control line, the touch signal line, and one touch electrode, and the fourth signal transmission unit is configured to control the conduction/non-conduction between the touch electrode and the touch signal line in response to a fourth control signal provided by the fourth sub-control line;

wherein the third control signal and the fourth control signal are complementary.

Optionally, the third signal transmission unit includes a second N-type transistor; and the fourth signal transmission unit includes a second P-type transistor; wherein a gate of the second N-type transistor is connected to the third sub-control line, and a gate of the second P-type transistor is connected to the fourth sub-control line;

a first electrode of the second N-type transistor and a first electrode of the second P-type transistor are both connected to the touch signal line; and a second electrode of the second N-type transistor and a second electrode of the second P-type transistor are both connected to the touch electrode.

Optionally, a width-to-length ratio of the P-type transistor in each signal transmission sub-circuit is greater than a width-to-length ratio threshold.

Optionally, the two transistors in each signal transmission sub-circuit are arranged in an extension direction of the connected touch signal line, and a distance between the gates of the two transistors in each signal transmission sub-circuit is greater than a distance threshold.

Optionally, in the two transistors in each signal transmission sub-circuit, an orthographic projection of an extension line of a source of one transistor in the extension direction of the touch signal line on the base substrate is not overlapped with an orthographic projection of an extension line of a source of the other transistor in the extension direction of the touch signal line on the base substrate; and in the two transistors in each signal transmission sub-circuit, an orthographic projection of an extension line of a drain of one transistor in the extension direction of the touch signal line on the base substrate is not overlapped with an orthographic projection of an extension line of a drain of the other transistor in the extension direction of the touch signal line on the base substrate.

Optionally, two signal transmission circuits are connected to the same touch signal line.

Optionally, touch electrodes connected to the at least two signal transmission circuits connected to the same touch signal line are disposed in a same column or a same row.

Optionally, the first control lines and the second control lines are extended in a first direction, and the touch signal lines are extended in a second direction, wherein the first direction and the second direction intersect.

Optionally, the first direction is perpendicular to the second direction.

Optionally, the non-display region and the display region are arranged in an extension direction of the touch signal line.

Optionally, a width of the non-display region in an extension direction of the touch signal line is less than a width threshold.

In another aspect, a method for driving a touch display substrate is provided. The method includes:

in a display stage, providing a control signal at an effective potential by each of first control lines and second control lines, and controlling a connected touch electrode and a connected target signal line to be conducted and the connected touch electrode and a connected touch signal line to be conducted by each signal transmission circuit in response to the control signal, wherein the target signal line and the touch signal line output common electrode signals to the touch electrode conducted with the target signal line and the touch signal line; and in an $i^{th}$ touch stage of n touch stages, providing a control signal at an effective potential by a first control line connected to an $i^{th}$ signal transmission circuit in at least two signal transmission circuits connected to each touch signal line, and providing a control signal at ineffective potential by a second control line connected to the $i^{th}$ signal transmission circuit; providing a control signal at the effective potential by a second control line connected to another signal transmission circuit other than the $i^{th}$ signal transmission circuit, and providing a control signal at the ineffective potential by a first control line connected to the another signal transmission circuit; controlling a connected touch electrode and the connected target signal line to be conducted by the $i^{th}$ signal transmission circuit in response to the control signal at the effective potential provided by the first control line, wherein the target signal line outputs a touch modulation signal to the touch electrode conducted with the target signal line; and controlling the connected touch electrode and the connected touch signal line to be conducted by the another signal transmission circuit in response to the control signal at the effective potential provided by the second control line, wherein the touch signal line receives a touch signal fed back by the touch electrode conducted with the touch signal line;

wherein n is a number of signal transmission circuits connected to each touch signal line, n is an integer greater than 1, and i is a positive integer not greater than n.

Optionally, each signal transmission circuit includes an N-type transistor and a P-type transistor; the first control line includes a first sub-control line and a second sub-control line; the second control line includes a third sub-control line and a fourth sub-control line; a gate of the N-type transistor being connected to the first sub-control line or the third sub-control line, and a gate of the P-type transistor being connected to the second sub-control line or the fourth sub-control line;

providing the control signal at the effective potential by the first control line connected to the $i^{th}$ signal transmission circuit and providing the control signal at the ineffective potential by the second control line connected to the $i^{th}$ signal transmission circuit in the $i^{th}$ touch stage includes:

providing a first control signal at a first potential by the first sub-control line connected to the $i^{th}$ signal transmission circuit, and providing a second control signal at a second potential by the second sub-control line connected to the signal transmission circuit; and providing a third control signal at the second potential by the third sub-control line connected to the $i^{th}$ signal transmission circuit, and providing a fourth control signal at the first potential by the fourth sub-control line connected to the $i^{th}$ signal transmission circuit; and providing the control signal at the effective potential by the second control line connected to the another signal transmission circuit, and providing the control signal at the ineffective potential by the first control line connected to the another signal transmission circuit in the $i^{th}$ touch stage includes:

providing a first control signal at the second potential by the first sub-control line connected to the another signal transmission circuit, and providing a second control signal at the first potential by the second sub-control line connected to the another signal transmission circuit; and providing a third control signal at the first potential by the third sub-control line connected to the another signal transmission circuit, and providing a fourth control signal at the second potential by the fourth sub-control line connected to the another signal transmission circuit;

wherein the first potential is a high potential relative to the second potential.

In still another aspect, a display device is provided. The display device includes a touch integrated circuit (IC) and the touch display substrate according to the above aspect; wherein the touch IC is connected to first control lines, second control lines, a target signal line, and touch signal lines in the touch display substrate, and the touch IC is configured to provide a control signal to the first control lines and the second control lines, provide a touch modulation signal and a common electrode signal to the target signal line, provide the common electrode signal to the touch signal lines, and receive a touch signal ted back by a touch electrode to the touch signal line.

Optionally, the display device further includes a chip on film (COF) and a flexible printed circuit; wherein the touch IC is fixed on the flexible circuit board by means of the COF.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic structural diagram of a touch display substrate in the related art;

FIG. 2 is a schematic structural diagram of a touch display substrate according to an embodiment of the present disclosure;

FIG. 9 is a flowchart of a method for driving a touch display substrate according to an embodiment of the present disclosure; and FIG. 10 is a timing diagram of signal lines in a touch display substrate according to an embodiment of the present disclosure;

FIG. 13 is a schematic structural diagram of a display device in the related art.

DETAILED DESCRIPTION

Figure 3:
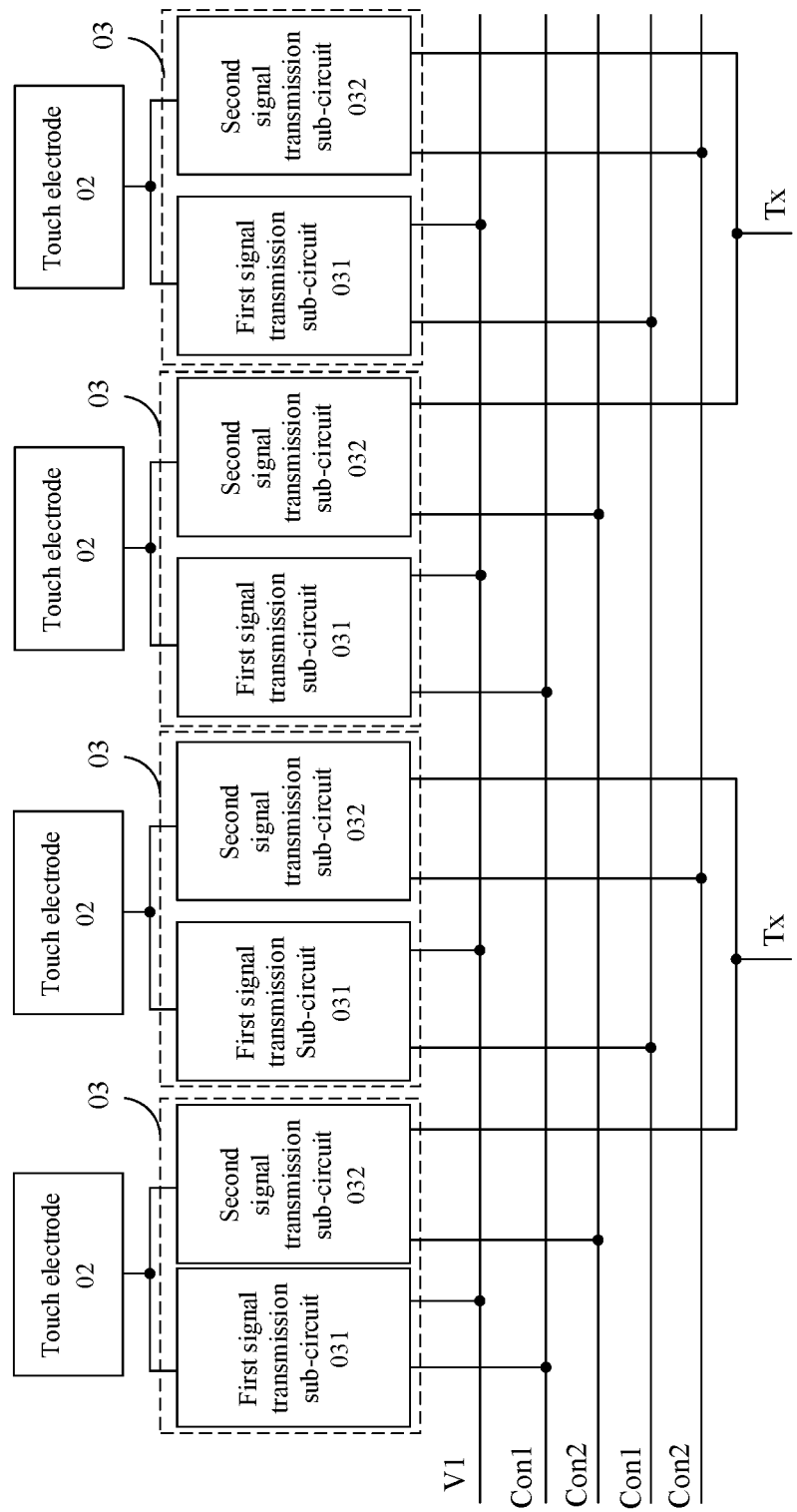
FIG. 3 is a schematic structural diagram of another touch display substrate according to an embodiment of the present disclosure.

For clearer descriptions of the objectives, technical solutions, and advantages of the present disclosure, the embodiments of the present disclosure are described in detail hereinafter with reference to the accompanying drawings.

Transistors used in all the embodiments of the present disclosure may be thin-film transistors, field-effect transistors or other devices having the same characteristics. According to the function of the transistors in a circuit, the transistors used in the embodiments of the present disclosure are mainly switching transistors. Because the source and drain of the switching transistor used herein are symmetrical, the source and drain are interchangeable. In the embodiments of the present disclosure, the source is referred to as a first electrode, and the drain is referred to as a second electrode. Alternatively, the drain is referred to as a first electrode, and the source is referred to as a second electrode. According to the form in the accompanying drawings, it is specified that an intermediate terminal of the transistor is the gate, a signal input terminal is the source, and a signal output terminal is the drain. In addition, the switching transistor used in the embodiments of the present disclosure may be either a P-type switching transistor or an N-type switching transistor. The P-type switching transistor is turned on when the gate is at a low level and is turned off when the gate is at a high level. The N-type switching transistor is turned on when the gate is at a high level and is turned off when the gate is at a low level.

In the related art, a TTDI display substrate includes a plurality of touch electrodes and touch signal lines connected to the plurality of touch electrodes in a one-to-one correspondence. Each touch signal line is also connected to a touch integrated circuit (IC). Each touch signal line is configured to provide a common electrode signal for a connected touch electrode in a display stage and transmit a touch signal between the connected touch electrode and the touch IC in a touch stage.

The touch display substrate includes a touch display substrate of an external touch module and the TTDI display substrate. External touch display substrates are gradually phased out from the market due to various disadvantages such as a low process yield, a big thickness of the module, and failure to implement a narrow border. With reference to FIG. 1, in a current TTDI display substrate, each touch electrode (i.e., a Vcom electrode) is connected to a touch IC by one touch signal line Tx, and different touch electrodes are connected to different touch signal lines Tx. That is, in the current TTDI display substrate, a ratio of the number of the touch signal lines Tx to the number of the touch electrodes is 1:1. Because a relatively large number of touch signal lines Tx need to be disposed, a relatively large number of signal line interfaces (also referred to as pins) need to be disposed on the touch IC. As a result, the touch IC that needs to be disposed has a relatively large size, which is not conducive to a narrow-border design.

The embodiments of the present disclosure provide a touch display substrate. A signal transmission circuit is added such that the number of touch signal lines to be disposed is reduced, which makes it possible to implement a TTDI display substrate with a large size and an ultra narrow border, for example, a large-size TTDI display substrate with an area of 8.8 feet and a resolution of 1600*2500.

FIG. 2 is a schematic structural diagram of a touch display substrate according to an embodiment of the present disclosure. As shown in FIG. 2, the touch display substrate may include:

a base substrate 01, including a display region A1 and a non-display region A2;

a plurality of touch electrodes 02 disposed in the display region A1, wherein the touch electrodes 02 may also be referred to as touch sensors; and a plurality of signal transmission circuits 03, a plurality of first control lines Con1, a plurality of second control lines Con2, a target signal line V1, and a plurality of touch signal lines Tx which are disposed in the non-display region A2.

Each signal transmission circuit 03 may be connected to one first control line Con1, one second control line Con2, the target signal line V1, one touch signal line Tx, and one touch electrode 02. Each signal transmission circuit 03 is configured to control the conduction/non-conduction between the touch electrode 02 and the target signal line V1 in response to a control signal provided by the first control line Con1 and control the conduction/non-conduction between the touch electrode 02 and the touch signal line Tx in response to a control signal provided by the second control line Con2.

For example, each signal transmission circuit 03 may control the touch electrode 02 to be conducted with the target signal line V1 when the potential of the control signal provided by the first control line Con1 is an effective potential, and may control the touch electrode 02 to be non-conducted with the target signal line V1 when the potential of the control signal provided by the first control line Con1 is an ineffective potential. When the touch electrode 02 is conducted with the target signal line V1, the target signal line V1 may output a target signal to the touch electrode 02.

Optionally, the target signal may be a common electrode signal Vcom or a touch modulation signal Touch. In the case that the target signal is a common electrode signal and the touch display substrate is an organic light-emitting diode (OLED) display substrate, the touch electrode 02 may be used as a cathode, and the cathode and an anode jointly drive a light-emitting element to emit light. Alternatively, in the case that the target signal is a common electrode signal and the touch display substrate is a liquid crystal display (LCD) substrate, the touch electrode 02 may be used as a common electrode, and the common electrode and a pixel electrode jointly drive liquid crystals to deflect, thereby implementing normal display.

For another example, each signal transmission circuit 03 may control the touch electrode 02 to be conducted with the touch signal line Tx when the potential of the control signal provided by the second control line Con2 is an effective potential, and may control the touch electrode 02 to be non-conducted with the touch signal line Tx when the potential of the control signal provided by the second control line Con2 is an ineffective potential. When the touch electrode 02 is conducted with the touch signal line Tx, the touch signal line Tx may output a common electrode signal to the touch electrode 02 or receive a touch signal fed back by the touch electrode 02 in response to a touch modulation signal. In addition, each touch signal line Tx may be further connected to a control IC (not shown in the figure) and transmit the received touch signal to the touch IC such that the touch IC determines whether the touch electrode 02 is touched based on the touch signal, thereby implementing touch detection.

Referring to FIG. 2 again, in the embodiments of the present disclosure, at least two signal transmission circuits 03 may be connected to the same touch signal line Tx. In the at least two signal transmission circuits 03 connected to the same touch signal line Tx, any two signal transmission circuits 03 are connected to different first control lines Con1 and are connected to different second control lines Con2. Correspondingly, the number of the first control lines Con1 and the number of the second control lines Con2 in the touch display substrate are both equal to the number of the signal transmission circuits 03 connected to the same touch signal line Tx.

In such an arrangement, the potential of the control signal provided by each first control line and the potential of the control signal provided by each second control line may be flexibly set, such that the signal transmission circuits 03 connected to the same touch signal line Tx can independently and reliably control, under the control of respective connected control lines, the operation of the touch electrodes 02 connected to the signal transmission circuits 03. Therefore, time-division driving of at least two touch electrodes 02 sharing the same touch signal line Tx can be implemented, which ensures the normal operation of the touch display substrate. In addition, because at least two touch electrodes 02 can share the same touch signal line Tx, compared with the related art in FIG. 1, the number of the touch signal lines Tx is at least halved, which facilitates a narrow-border design.

Optionally, as shown in FIG. 2, in the embodiments of the present disclosure, the touch display substrate may include only one target signal line V1 or may include a plurality of target signal lines V1.

In summary, the embodiment of the present disclosure provides a touch display substrate. The touch display substrate includes signal transmission circuits. Each signal transmission circuit is connected to one touch electrode, at least two signal transmission circuits may be connected to the same touch signal line, and each signal transmission circuit may control, under the control of the connected control line, the conduction/non-conduction between the connected touch electrode and the connected target signal line or the touch signal line. Therefore, at least two touch electrodes can share one touch signal line while ensuring the normal display of the touch display substrate, which reduces the number of traces in the lead region, thereby facilitating a narrow-border design.

Optionally, as shown in FIG. 2, more than two signal transmission circuits 03 may be set to be connected to the same touch signal line Tx. Certainly, only two signal transmission circuits 03 may be set to be connected to the same touch signal line Tx. Correspondingly, the touch display substrate may include only two different first control lines Con1 and two different second control lines Con2.

In the case that every two touch electrodes 02 of the plurality of touch electrodes 02 in the touch display substrate share the same touch signal line Tx, the ratio of the number of the touch signal lines Tx to the number of the touch electrodes is 1:2. Compared with the related art, the number of the touch signal lines Tx is halved. For example, assuming that a total of 2000 touch electrodes 02 are included, then 2000 touch signal lines Tx need to be disposed in the touch display substrate in the related art, while only 1000 touch signal lines Tx need to be disposed in the touch display substrate in the embodiments of the present disclosure.

The touch display substrate provided in the embodiments of the present disclosure is described in the following embodiments by taking an example in which every two signal transmission circuits 03 are connected to the same touch signal line Tx.

Optionally, FIG. 3 is a schematic structural diagram of another touch display substrate according to an embodiment of the present disclosure. As shown in FIG. 3, each signal transmission circuit 03 may include a first signal transmission sub-circuit 031 and a second signal transmission sub-circuit 032. (FIG. 3 only schematically shows four signal transmission circuits 03).

The first signal transmission sub-circuit 031 may be connected to the first control line Con1, the target signal line V1, and the touch electrode 02. The first signal transmission sub-circuit 031 may be configured to control the conduction/non-conduction between the touch electrode 02 and the target signal line V1 in response to the control signal provided by the first control line Con1.

For example, the first signal transmission sub-circuit 031 may control the touch electrode 02 to be conducted with the target signal line V1 when the potential of the control signal provided by the first control line Con1 is an effective potential, and may control the touch electrode 02 to be non-conducted with the target signal line V1 when the potential of the control signal provided by the first control line Con1 is an ineffective potential.

The second signal transmission sub-circuit 032 may be connected to the second control line Con2, the touch signal line Tx, and the touch electrode 02. The second signal transmission sub-circuit 032 is configured to control the conduction/non-conduction between the touch electrode 02 and the touch signal line Tx in response to the control signal provided by the second control line Con2.

For example, the second signal transmission sub-circuit 032 may control the touch electrode 02 to be conducted with the touch signal line Tx when the potential of the control signal provided by the second control line Con2 is an effective potential, and may control the touch electrode 02 to be non-conducted with the touch signal line Tx when the potential of the control signal provided by the second control line Con2 is an ineffective potential.

Figure 4:
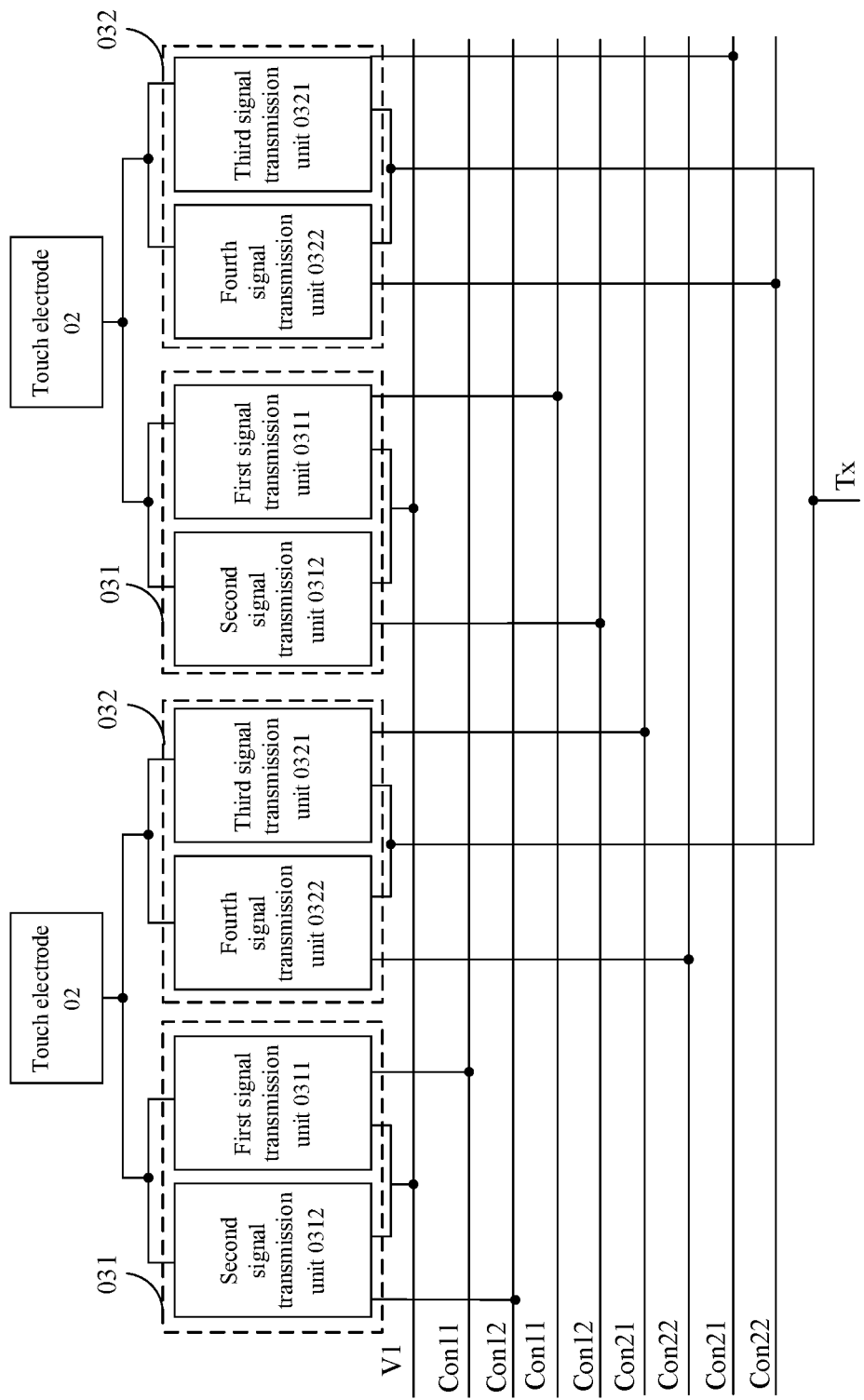
FIG. 4 is a schematic structural diagram of still another touch display substrate according to an embodiment of the present disclosure.

Optionally, FIG. 4 is a schematic structural diagram of still another touch display substrate according to an embodiment of the present disclosure. As shown in FIG. 4, the first signal transmission sub-circuit 031 may include a first signal transmission unit 0311 and a second signal transmission unit 0312. Correspondingly, the first control line Con1 may include a first sub-control line Con11 and a second sub-control line Con12 (FIG. 4 only schematically shows two signal transmission circuits).

The first signal transmission unit 0311 may be connected to the first sub-control line Con11, the target signal line V1, and one touch electrode 02. The first signal transmission unit 0311 may be configured to control the conduction/non-conduction between the touch electrode 02 and the target signal line V1 in response to a first control signal provided by the first sub-control line Con11.

For example, the first signal transmission unit 0311 may control the touch electrode 02 to be conducted with the target signal line V1 when the potential of the first control signal provided by the first sub-control line Con11 is an effective potential, and may control the touch electrode 02 to be non-conducted with the target signal line V1 when the potential of the first control signal provided by the first sub-control line Con11 is an ineffective potential.

The second signal transmission unit 0312 may be connected to the second sub-control line Con12, the target signal line V1, and one touch electrode 02. The second signal transmission unit 0312 may be configured to control the conduction/non-conduction between the touch electrode 02 and the target signal line V1 in response to a second control signal provided by the second sub-control line Con12.

For example, the second signal transmission unit 0312 may control the touch electrode 02 to be conducted with the target signal line V1 when the potential of the second control signal provided by the second sub-control line Con12 is an effective potential, and may control the touch electrode 02 to be non-conducted with the target signal line V1 when the potential of the second control signal provided by the second sub-control line Con12 is an ineffective potential.

Optionally, the first control signal and the second control signal may be complementary. That is, the potential of the second control signal is a second potential when the potential of the first control signal is a first potential; and the potential of the second control signal is the first potential when the potential of the first control signal is the second potential. Correspondingly, to ensure that the touch electrode 02 can be conducted or non-conducted with the target signal line V1 reliably, the first control signal being at an effective potential may refer to that the first control signal is at the first potential, the second control signal being at an effective potential may refer to that the second control signal is at the second potential, the first control signal being at an ineffective potential may refer to that the first control signal is at the second potential, and the second control signal being at an ineffective potential may refer to that the second control signal is at the first potential. The first potential may be a high potential relative to the second potential.

Continuing referring to FIG. 4, similar to the first signal transmission sub-circuit 031, the second signal transmission sub-circuit 032 may include a third signal transmission unit 0321 and a fourth signal transmission unit 0322. Correspondingly, the second control line Con2 may include a third sub-control line Con21 and a fourth sub-control line Con22.

The third signal transmission unit 0321 may be connected to the third sub-control line Con21, the touch signal line Tx, and one touch electrode 02. The third signal transmission unit 0321 may be configured to control the conduction/non-conduction between the touch electrode 02 and the touch signal line Tx in response to a third control signal provided by the third sub-control line Con21.

For example, the third signal transmission unit 0321 may control the touch electrode 02 to be conducted with the touch signal line Tx when the potential of the third control signal provided by the third sub-control line Con21 is an effective potential, and may control the touch electrode 02 to be non-conducted with the touch signal line Tx when the potential of the third control signal provided by the third sub-control line Con21 is an ineffective potential.

The fourth signal transmission unit 0322 may be connected to the fourth sub-control line Con22, the touch signal line Tx, and one touch electrode 02. The fourth signal transmission unit 0322 may be configured to control the conduction/non-conduction between the touch electrode 02 and the touch signal line Tx in response to a fourth control signal provided by the fourth sub-control line Con22.

For example, the fourth signal transmission unit 0322 may control the touch electrode 02 to be conducted with the touch signal line Tx when the potential of the fourth control signal provided by the fourth sub-control line Con22 is an effective potential, and may control the touch electrode 02 to be non-conducted with the touch signal line Tx when the potential of the fourth control signal provided by the fourth sub-control line Con22 is an ineffective potential.

In some embodiments, similar to the first control signal and the second control signal, the third control signal and the fourth control signal may also be complementary. That is, the potential of the fourth control signal is the second potential when the potential of the third control signal is the first potential; and the potential of the fourth control signal is the first potential when the potential of the third control signal is the second potential. Correspondingly, to ensure that the touch electrode 02 can be conducted or non-conducted with the touch signal line Tx reliably, the third control signal being at an effective potential may refer to that the third control signal is at the first potential, the fourth control signal being at an effective potential may refer to that the fourth control signal is at the second potential, the third control signal being in at ineffective potential may refer to that the third control signal is at the second potential, and the fourth control signal being at an ineffective potential may refer to that the fourth control signal is at the first potential.

Figure 5:
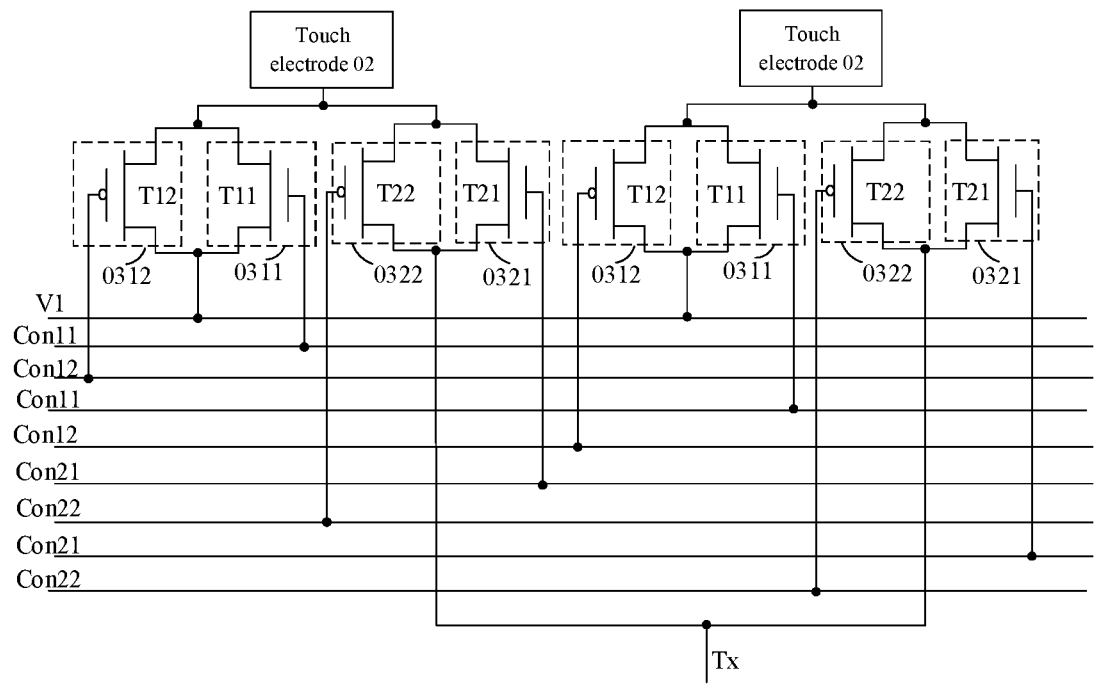
FIG. 5 is a schematic structural diagram of still another touch display substrate according to an embodiment of the present disclosure.

By taking the touch display substrate shown in FIG. 4 as an example, FIG. 5 is a schematic structural diagram of still another touch display substrate according to an embodiment of the present disclosure. As shown in FIG. 5, the first signal transmission unit 0311 may include a first N-type transistor T11, the second signal transmission unit 0312 may include a first P-type transistor T12, the third signal transmission unit 0321 may include a second N-type transistor 121, and the fourth signal transmission unit 0322 may include a second P-type transistor 122.

A gate of the first N-type transistor T11 may be connected to the first sub-control line Con11, and a gate of the first P-type transistor T12 may be connected to the second sub-control line Con12.

A first electrode of the first N-type transistor T11 and a first electrode of the first P-type transistor T12 may be both connected to the target signal line V1.

A second electrode of the first N-type transistor T11 and a second electrode of the first P-type transistor T12 may be connected to one touch electrode 02.

A gate of the second N-type transistor T21 may be connected to the third sub-control line Con21, and a gate of the second P-type transistor T22 may be connected to the fourth sub-control line Con22.

A first electrode of the second N-type transistor T21 and a first electrode of the second P-type transistor T22 may be both connected to the touch signal line Tx.

A second electrode of the second N-type transistor T21 and a second electrode of the second P-type transistor T22 may be both connected to the touch electrode 02.

As can be known with reference to FIG. 4, the first control signal and the second control signal are set to be complementary, such that it can be ensured that the first P-type transistor and the first N-type transistor can be simultaneously turned on or off, thereby ensuring that the touch electrode 02 can be conducted or non-conducted with the target signal line V1 reliably. The third control signal and the fourth control signal are set to be complementary, such that it can be ensured that the second P-type transistor and the second N-type transistor can be simultaneously turned on or off, thereby ensuring that the touch electrode 02 can be conducted or non-conducted with the touch signal line Tx reliably.

Figure 6:
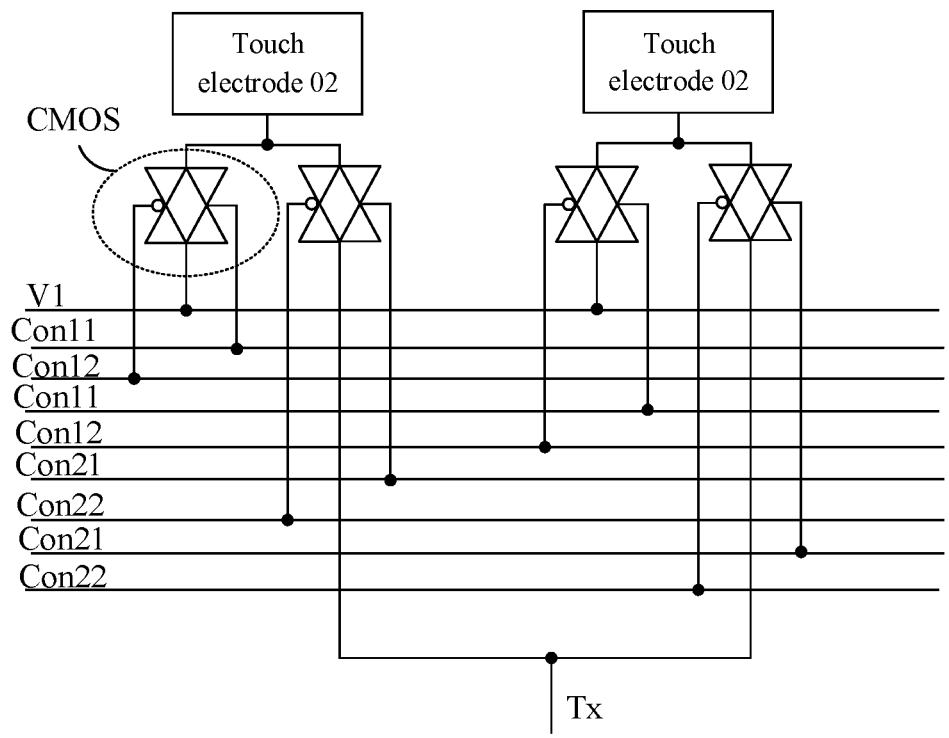
FIG. 6 is a schematic structural diagram of still another touch display substrate according to an embodiment of the present disclosure.

Optionally, the transistors in the embodiments of the present disclosure may all be metal oxide semiconductor (MOS) transistors. That is, the P-type transistor may be referred to as a PMOS transistor, and the N-type transistor may be referred to as an NMOS transistor. With reference to FIG. 4 and FIG. 5, each signal transmission sub-circuit is a complementary metal-oxide-semiconductor (CMOS) transmission gate formed of an NMOS transistor and a PMOS transistor connected in parallel. In FIG. 6 further shows an optional touch display substrate by taking the symbol of the CMOS transmission gate as an example. Assuming that N CMOS transmission gates are connected to the same touch electrode 02, then the touch display substrate includes a 1:N CMOS multiplex (MUX) circuits. Correspondingly, the touch display substrate shown in FIG. 4 and FIG. 5 includes a 1:2 COMS MUX circuits.

Certainly, each signal transmission sub-circuit in the embodiments of the present disclosure may include only one NMOS transistor or one PMOS transistor. Correspondingly, with reference to FIG. 2 and FIG. 3, the first control line Con1 in the touch display substrate does not need to be divided into the first sub-control line Con11 and the second sub-control line Con12, and the second control line Con2 also does not need to be divided into the third sub-control line Con21 and the fourth sub-control line Con22.

Optionally, the touch display substrate in the embodiments of the present disclosure may be used with an active capacitive touch stylus (active stylus for short), i.e., the touch display substrate supports an active stylus function. The active stylus may actively send a signal to the touch display substrate, such that the touch IC connected to the touch signal line Tx in the touch display substrate performs a corresponding action, for example, detects the position of the active stylus, in response to the signal sent by the active stylus.

In addition, in a scenario of using the active stylus gesture wake-up function in a low power wake-up gesture mode (LPWG), i.e., in a scenario in which an active stylus is used in place of a user's limb to draw a target shape on a touch display substrate to wake up a screen in the LPWG mode, the touch display substrate usually needs to first transmit a signal to the active stylus. The signal may be referred to as an uplink signal. The magnitude of the signal may be +6 volts (V). The lowest potential (which may be referred to as VGL) of each signal terminal or signal line is usually −5.8 V, and the highest potential (which may be referred to as VGH) is usually +5.8 V. In the case that only the NMOS transistors are used, when the uplink signal rises to +4 V, the on resistance of the NMOS transistor may be up to 153 kilohms (KΩ), and the uplink signal attenuates severely and fails to wake up the screen normally. In the case that the CMOS transmission gates are used, the on resistance can be effectively reduced, such that the uplink signal may be up to −6 V normally and can normally wake up the screen. That is, in the case that the CMOS transmission gates are used, the touch display substrate in the embodiments of the present disclosure can not only support the active stylus function but also support the wake-up of a screen from a screen-off state by an active stylus.

For example, Table 1 and Table 2 below show the on resistance Rds at different temperatures when an NMOS transistor is used and when a CMOS transmission gate is used respectively in an LPWG mode. Here, case represents a sampling label, vd represents a drain potential, Vds represents a source-drain voltage difference of a transistor, and the temperature is −10 degrees Celsius (° C.), 0° C., 25° C., and 85° C. E+i represents an power of 10, for example, E+08 represents an $8^{th}$ power of 10.

TABLE 1

|  | VGH/VGL | Case | Vd (V) | Vds (V) | −10° C. Rds | 0° C. Rds | 25° C. Rds | 85° C. Rds |
|---|---|---|---|---|---|---|---|---|
| LPWG | 5.8 V/−5.8 V | 10 | 5.8 | 0.1 | 3.22E+08 | 7.36E+07 | 2.888E+07 | 1.905E+07 |
|  |  | 11 | 5 |  | 3.82E+05 | 4.03E+05 | 6.942E+04 | 2.443E+06 |
|  |  | 12 | 4.5 |  | 3.33E+03 | 2.59E+03 | 1.077E+03 | 1.986E+02 |
|  |  | 13 | 4 |  | 1.53E+02 | 1.27E+02 | 7.428E+01 | 2.235E+01 |

TABLE 1-continued

| VGH/VGL | Case | Vd (V) | Vds (V) | −10° C. Rds | 0° C. Rds | 25° C. Rds | 85° C. Rds |
|---|---|---|---|---|---|---|---|
| | 14 | 3 | | 7.64E+00 | 7.21E+00 | 6.014E+00 | 3.765E+00 |
| | 15 | 2.5 | | 4.16E+00 | 4.01E+00 | 3.551E+00 | 2.544E+00 |
| | 16 | 2 | | 2.87E+00 | 2.80E+00 | 2.550E+00 | 1.868E+00 |
| | 17 | 1 | | 1.93E+00 | 1.89E+00 | 1.762E+00 | 1.420E+00 |
| | 18 | 0.2 | | 1.61E+00 | 1.58E+00 | 1.485E+00 | 6.418E−01 |

TABLE 2

| VGH/VGL | Case | Vd (V) | Vds (V) | −10° C. Rds | 0° C. Rds | 25° C. Rds | 85° C. Rds |
|---|---|---|---|---|---|---|---|
| LPWG 5.8 V/−5.8 V | 10 | 5.8 | 0.1 | 2.09E+00 | 1.90E+00 | 1.881E+00 | 9.700E−01 |
| | 11 | 5 | | 2.21E+00 | 2.01E+00 | 1.990E+00 | 1.080E+00 |
| | 12 | 4.5 | | 2.30E+00 | 2.09E+00 | 2.069E+00 | 1.160E+00 |
| | 13 | 4 | | 2.39E+00 | 2.17E+00 | 2.148E+00 | 1.240E+00 |
| | 14 | 3 | | 2.59E+00 | 2.35E+00 | 2.327E+00 | 1.420E+00 |
| | 15 | 2.5 | | 2.74E+00 | 2.49E+00 | 2.465E+00 | 1.560E+00 |
| | 16 | 2 | | 2.84E+00 | 2.58E+00 | 2.554E+00 | 1.650E+00 |
| | 17 | 1 | | 1.93E+00 | 1.89E+00 | 1.762E+00 | 1.420E+00 |
| | 18 | 0.2 | | 1.61E+00 | 1.58E+00 | 1.485E+00 | 6.418E−01 |

By taking Vd being 5 V as an example, it can be seen in comparison of Table 1 and Table 2 that, when the NMOS transistor is used, at −10° C., 0° C., 25° C., and 85° C., the on resistance is 3.82 E+05, 4.03 E+05, 6.942 E+04, and 2.443 E+06 respectively; and when the CMOS transmission gate is used, at −10° C., 0° C., 25° C., and 85° C., the on resistance is 2.21 E+00, 2.01E+00, 1.990E+00, and 1.080 E+00 respectively. It can thus be known that when the CMOS transmission gate is used, the on resistance is significantly reduced, such that the screen-off wake-up function can be reliably implemented.

In addition, compared with a single NMOS transistor, by providing a CMOS transmission gate, on the one hand, the size of the MOS transistor may be smaller. For example, when the NMOS transistor is used, the size is usually 0.4 millimeters (mm). While, when the CMOS transmission gate is used, the size can be reduced to 0.28 mm. On the other hand, gate-source voltage differences Vgs of the PMOS transistor and the NMOS transistor in the CMOS transmission gate can be reliably set to be always greater than a voltage difference threshold (for example, 8 V), such that the PMOS transistor and the NMOS transistor can continuously operate in a saturation area, which can further ensure a relatively small on resistance. Therefore, a signal loss is avoided and the accuracy and reliability of signal transmission is ensured.

Figure 7:
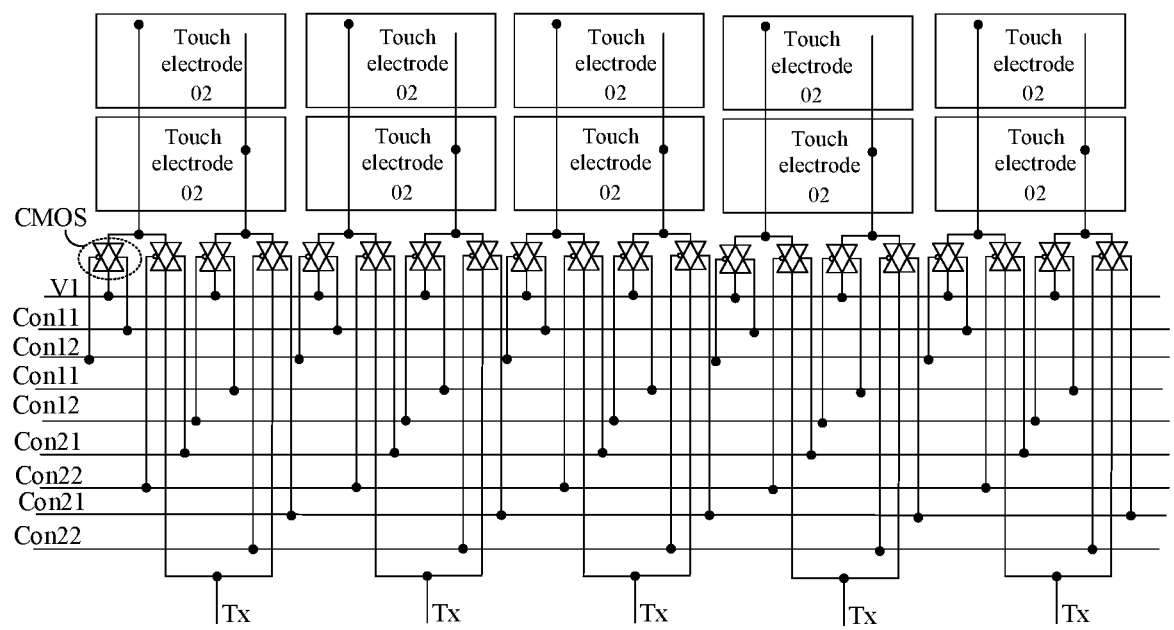
FIG. 7 is a schematic structural diagram of still another touch display substrate according to an embodiment of the present disclosure.

Optionally, it can be known with reference to FIG. 2 to FIG. 6 that, the touch electrodes 02 connected to the at least two signal transmission circuits 03 connected to the same touch signal line Tx may be disposed in the same row. Certainly, referring to FIG. 7, the touch electrodes 02 connected to the at least two signal transmission circuits 03 connected to the same touch signal line Tx may also be disposed in the same column. In this way, in the case of row-by-row driving, on the basis of the time-division driving of two touch electrodes 02 sharing the same touch signal line Tx, the odd-numbered rows of touch electrodes 02 and the even-numbered rows of touch electrodes 02 may be simultaneously driven, which ensures the transmission uniformity of touch signals in the touch display substrate.

Optionally, the first control lines Con1 and the second control lines Con2 may all be extended in a first direction X1, the touch signal lines Tx may all be extended in a second direction Y1, and the first direction X1 and the second direction Y1 intersect. For example, with reference to FIG. 2 to FIG. 7, the first direction X1 may be perpendicular to the second direction Y1. (FIG. 2 only schematically illustrates the first direction X1 and the second direction Y1). Such an arrangement can facilitate signal wiring, thereby further facilitating the implementation of a narrow border.

Figure 8:
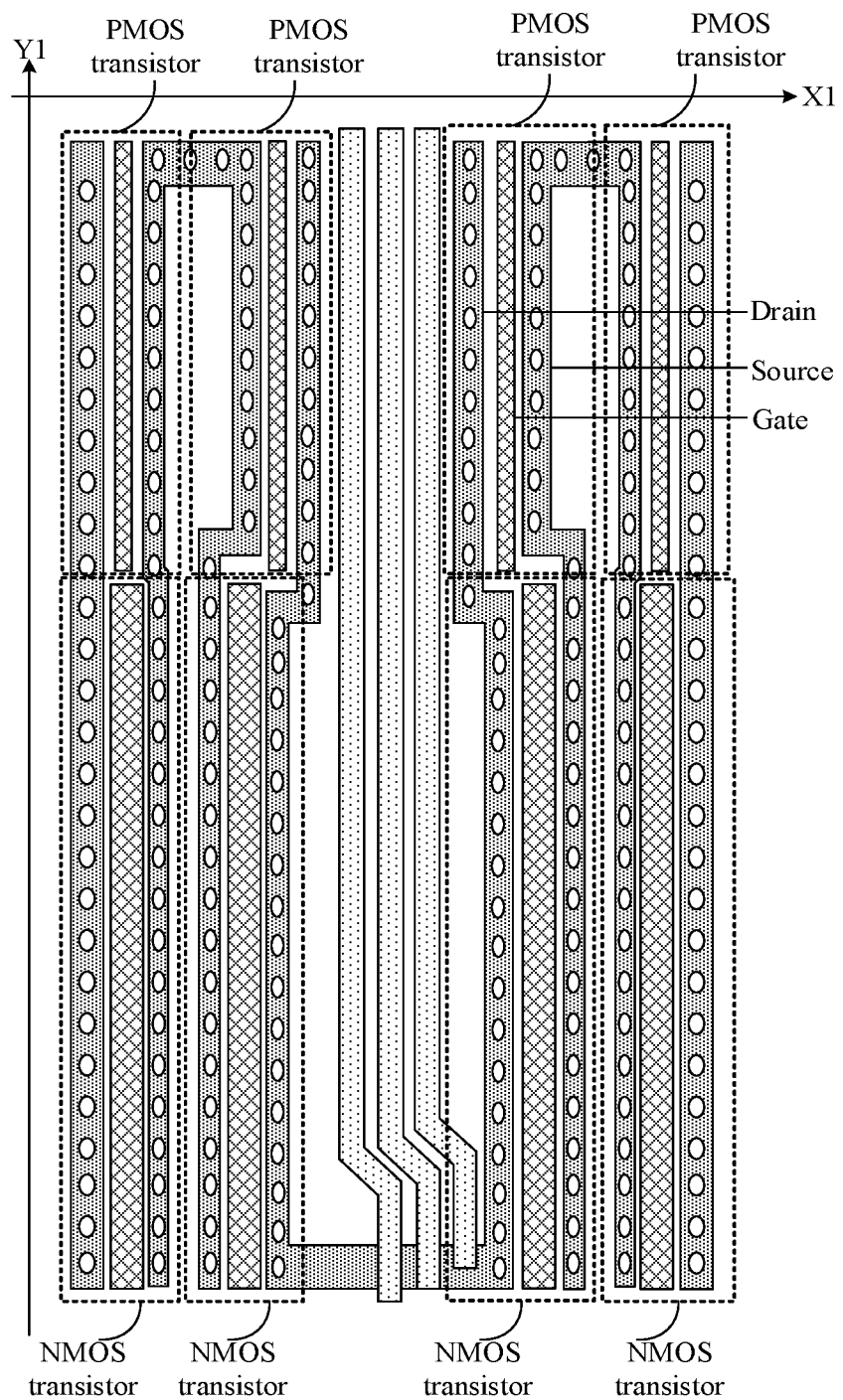
FIG. 8 is a structural layout of a CMOS transmission gate according to an embodiment of the present disclosure.

Optionally, FIG. 8 is a structural layout of a CMOS transmission gate according to an embodiment of the present disclosure. As can be seen with reference to FIG. 5 to FIG. 8, one PMOS transistor and one NMOS transistor in the CMOS transmission gate may be arranged in an extension direction (that is, the second direction Y1) of the connected touch signal line Tx. FIG. 8 schematically shows the structure of a total of four CMOSs.

Optionally, a width-to-length ratio of the P-type transistor in each signal transmission sub-circuit may be greater than a width-to-length ratio threshold. The width-to-length ratio threshold may be a preset fixed value. That is, the device size of the PMOS transistor in the CMOS transmission gate may be relatively large. In such an arrangement, the capability of transmitting positive voltage signals of the PMOS transistor can be enhanced, thereby further ensuring that the active stylus can reliably wake up the screen from a screen-off state.

Optionally, a distance between the gates of the two transistors in each signal transmission sub-circuit may be greater than a distance threshold. The distance threshold may be a preset value. That is, there may be a distance between the gates of the NMOS transistor and the PMOS transistor in the CMOS transmission gate. For example, with reference to FIG. 8, there is a distance between the gates of the PMOS transistor and the NMOS transistor in the CMOS transmission gate in both the first direction X1 and the second direction Y1. That is, the gates of the PMOS transistor and the NMOS transistor in the CMOS transmission gate are staggered from each other on the base substrate.

Optionally, in the two transistors in each signal transmission sub-circuit, an orthographic projection of an extension line of a source of one transistor in the extension direction of the touch signal line on the base substrate is not overlapped with an orthographic projection of an extension line of a source of the other transistor in the extension direction of the touch signal line on the base substrate, and an orthographic projection of an extension line of a drain of one transistor in the extension direction of the touch signal line on the base substrate is not overlapped with an orthographic projection of an extension line of a drain of the other transistor in the extension direction of the touch signal line on the base substrate. That is, with reference to FIG. 8, in the second direction Y1, the sources and drains of the NMOS transistor and the PMOS transistor in each CMOS transmission gate are staggered from each other.

The staggered arrangement of the gates, the sources or the drains can effectively reduce the coupling capacitance generated between the NMOS transistor and the PMOS transistor, thereby ensuring the driving capability of the transistors.

Optionally, with reference to FIG. 2, the non-display region A2 and the display region A1 may be arranged in the extension direction Y1 of the touch signal line Tx. By disposing the signal transmission circuit 03, the width of the non-display region A2 in the extension direction of the touch signal line Tx may be less than a width threshold, that is a narrow-border design is achieved.

In summary, the embodiment of the present disclosure provides a touch display substrate. The touch display substrate includes signal transmission circuits. Each signal transmission circuit is connected to one touch electrode, at least two signal transmission circuits may be connected to the same touch signal line, and each signal transmission circuit may control, under the control of the connected control line, the conduction/non-conduction between the connected touch electrode and the connected target signal line or the touch signal line. Therefore, while it is ensured that the touch display substrate operates normally, at least two touch electrodes can share one touch signal line, which reduces the number of traces in the lead region, thereby facilitating a narrow-border design.

FIG. 9 is a flowchart of a method for driving a touch display substrate according to an embodiment of the present disclosure. The method may be applied to drive the touch display substrate shown in any one of FIG. 2 to FIG. 7. As shown in FIG. 9, the method may include the following steps.

In step 901, in a display stage, each of first control lines and second control lines provides a control signal at an effective potential, and each signal transmission circuit controls a connected touch electrode and a connected target signal line to be conducted and the connected touch electrode and a connected touch signal line to be conducted in response to the control signal, wherein the target signal line and the touch signal line output common electrode signals to the touch electrode which is conducted with the target signal line and the touch signal line.

In step 902, in an $i^{th}$ touch stage of n touch stages, in at least two signal transmission circuits connected to each touch signal line, a first control line connected to an $i^{th}$ signal transmission circuit provides a control signal at an effective potential, and a second control line connected to the $i^{th}$ signal transmission circuit provides a control signal at an ineffective potential; a second control line connected to another signal transmission circuit other than the $i^{th}$ signal transmission circuit provides a control signal at an effective potential, and a first control line connected to the another signal transmission circuit provides a control signal at an ineffective potential; and the $i^{th}$ signal transmission circuit controls a connected touch electrode and the connected target signal line to be conducted in response to the control signal at the effective potential provided by the first control line, wherein the target signal line outputs a touch modulation signal to the touch electrode conducted to the target signal line, and the another signal transmission circuit controls a connected touch electrode and a connected touch signal line to be conducted in response to the control signal at the effective potential provided by the second control line, wherein the touch signal line receives a touch signal fed back by the touch electrode conducted with the touch signal line.

Here, n is the number of signal transmission circuits connected to each touch signal line, n is an integer greater than 1, and i is a positive integer not greater than n.

In summary, the embodiment of the present disclosure provides a method for driving a touch display substrate. According to this method, each signal transmission circuit can reliably control the conduction/non-conduction between the connected touch electrode and the connected target signal line or between the connected touch electrode and the touch signal line under the control of the connected control line, which can ensure the normal operation of the touch display substrate. In addition, in the touch display substrate, at least two signal transmission circuits are connected to the same touch signal line. Therefore, at least two touch electrodes can share one touch signal line, which reduces the number of traces in the lead area, thereby facilitating a narrow-border design.

Optionally, with reference to FIG. 5, each signal transmission circuit may include one N-type transistor and one P-type transistor. The first control line includes a first sub-control line and a second sub-control line. The second control line includes a third sub-control line and a fourth sub-control line. The gate of the N-type transistor is connected to the first sub-control line or the third sub-control line, and the gate of the P-type transistor is connected to the second sub-control line or the fourth sub-control line.

Correspondingly, providing the control signal at the effective potential by the first control line connected to the $i^{th}$ signal transmission circuit and providing the control signal at the ineffective potential by the second control line connected to the $i^{th}$ signal transmission circuit in the $i^{th}$ touch stage includes: providing a first control signal at a first potential by the first sub-control line connected to the $i^{th}$ signal transmission circuit, providing a second control signal in a second potential by the second sub-control line connected to the $i^{th}$ signal transmission circuit, providing a third control signal at the second potential by the third sub-control line connected to the $i^{th}$ signal transmission circuit, and providing a fourth control signal at the first potential by the fourth sub-control line connected to the $i^{th}$ signal transmission circuit.

Correspondingly, providing the control signal at the effective potential by the second control line connected to the another signal transmission circuit and providing the control signal at the ineffective potential by the first control line connected to the another signal transmission circuit in the $i^{th}$ touch stage includes: providing a first control signal at the second potential by the first sub-control line connected to the another signal transmission circuit, providing a second control signal at the first potential by the second sub-control line connected to the another signal transmission circuit, providing a third control signal at the first potential by the third sub-control line connected to the another signal transmission circuit, and providing a fourth control signal at the second potential by the fourth sub-control line connected to the another signal transmission circuit. The first potential may be a high potential relative to the second potential.

Optionally, in the embodiments of the present disclosure, the $i^{th}$ touch stage may be performed in a blanking stage. Illustratively, by taking an example in which in the touch display substrate shown in FIG. 5, the first sub-control line connected to the first N-type transistor T11 connected to one touch electrode 02 is Con11_1N, the third sub-control line connected to the second N-type transistor T21 is Con21_1N, the second sub-control line connected to the first P-type transistor T12 is Con12_1P, and the fourth sub-control line connected to the second P-type transistor T22 is Con22_1P; and the first sub-control line connected to the first N-type transistor T11 connected to the other touch electrode 02 is Con11_2N, the third sub-control line connected to the second N-type transistor T21 is Con21_2N, the second sub-control line connected to the first P-type transistor T12 is Con12_2P, and the fourth sub-control line connected to the second P-type transistor T22 is Con22_2P, the driving principle of the touch display substrate is described as follows.

In the touch display substrate shown in FIG. 5, every two signal transmission circuits 03 are connected to the same touch signal line Tx, that is, every two touch electrodes 02 share the same touch signal line Tx. Therefore, as can be seen in combination with FIG. 10, there are a total of two touch stages t21 and t22 between every two adjacent display stages.

As shown in FIG. 10, in each display t1, the potentials of the first control signals provided by the two first sub-control lines Con11_1N and Con11_2N and the potentials of the third control signals provided by the two third sub-control lines Con21_1N and Con21_2N are all the first potential VGH (that is, an effective potential); and the potentials of the second control signals provided by the two second sub-control lines Con12_1P and Con12_2P and the potentials of the fourth control signals provided by the two fourth sub-control lines Con22_1P and Con22_2P are all the second potential VGL (that is, an effective potential). The two first N-type transistors T11, two first P-type transistors T12, two second N-type transistors T21, and two second P-type transistors T22 are all turned on. In this case, the target signal line V1 and the touch signal line Tx simultaneously output common electrode signals to the corresponding touch electrode 02 to implement normal display and avoid defects in the touch electrode 02.

In the first touch stage t21, the potential of the first control signal provided by the first first sub-control line Con11_1N is the second potential, and the potential of the first control signal provided by the second first sub-control line Con11_2N is the first potential. The potential of the second control signal provided by the first second sub-control line Con12_1P is the first potential, and the potential of the second control signal provided by the second second sub-control line Con12_2P is the second potential. The potential of the third control signal provided by the first third sub-control line Con21_1N is the first potential, and the potential of the third control signal provided by the second third sub-control line Con21_2N is the second potential. The potential of the fourth control signal provided by the first fourth sub-control line Con22_1P is the second potential, and the potential of the fourth control signal provided by the second fourth sub-control line Con22_2P is the first potential.

Furthermore, the first N-type transistor T11 connected to the first sub-control line Con11_1N is turned off, the first P-type transistor T12 connected to the second sub-control line Con12_1P is turned off, the second N-type transistor T21 connected to the third sub-control line Con21_1N is turned on, and the second P-type transistor T22 connected to the fourth sub-control line Con22_1P is turned on. The target signal line V1 outputs a common electrode signal to the second touch electrode 02 through the second P-type transistor T22 and the second N-type transistor T21 which are turned on. The first N-type transistor T11 connected to the first sub-control line Con11_2N is turned on, the first P-type transistor T12 connected to the second sub-control line Con11_2P is turned on, the second N-type transistor T21 connected to the third sub-control line Con21_2N is turned off, and the second P-type transistor T22 connected to the fourth sub-control line Con22_2P is turned off. The first touch electrode 02 outputs a touch signal to the touch signal line Tx through the first N-type transistor T11 and the first P-type transistor T12 which are turned on, such that the touch IC implements the touch function based on the touch signal. In this way, the time-division driving of two touch electrodes 02 sharing the same touch signal line Tx is implemented.

Similarly, in the second touch stage t22, the potential of the first control signal provided by the first first sub-control line Con11_1N is the first potential, and the potential of the first control signal provided by the second first sub-control line Con11_2N is the second potential. The potential of the second control signal provided by the first second sub-control line Con12_1P is the second potential, and the potential of the second control signal provided by the second second sub-control line Con12_2P is the first potential. The potential of the third control signal provided by the first third sub-control line Con21_1N is the second potential, and the potential of the third control signal provided by the second third sub-control line Con21_2N is the first potential. The potential of the fourth control signal provided by the first fourth sub-control line Con22_1P is the first potential, and the potential of the fourth control signal provided by the second fourth sub-control line Con22_2P is the second potential.

Furthermore, the first N-type transistor T11 connected to the first sub-control line Con11_1N is turned on, the first P-type transistor T12 connected to the second sub-control line Con12_1P is turned on, the second N-type transistor T21 connected to the third sub-control line Con21_1N is turned off, and the second P-type transistor T22 connected to the fourth sub-control line Con22_1P is turned off. The target signal line V1 outputs a common electrode signal to the first touch electrode 02 through the first N-type transistor T11 and the first P-type transistor T12 which are turned on. The first N-type transistor T11 connected to the first sub-control line Con11_2N is turned off, the first P-type transistor T12 connected to the second sub-control line Con11_2P is turned off, the second N-type transistor T21 connected to the third sub-control line Con21_2N is turned on, and the second P-type transistor T22 connected to the fourth sub-control line Con22_2P is turned on. The second touch electrode 02 outputs a touch signal to the touch signal line Tx through the second N-type transistor T21 and the second P-type transistor T22 which are turned on, such that the touch IC implements the touch function based on the touch signal. In this way, the time-division driving of two touch electrodes 02 sharing the same touch signal line Tx is implemented. With reference to FIG. 10, in the touch stages, the potentials (LFD and AFE) on the touch signal line Tx keep changing constantly.

In summary, the embodiment of the present disclosure provides a method for driving a touch display substrate.

According to this method, each signal transmission circuit can reliably control the conduction/non-conduction between the connected touch electrode and the connected target signal line or between the connected touch electrode and the touch signal line under the control of the connected control line, which can ensure the normal operation of the touch display substrate. In addition, in the touch display substrate, at least two signal transmission circuits are connected to the same touch signal line. Therefore, at least two touch electrodes can share one touch signal line, which reduces the number of traces in the lead area, thereby facilitating a narrow-border design.

Figure 11:
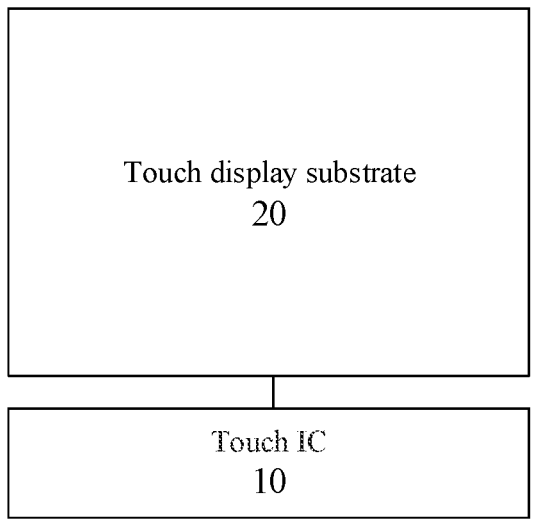
FIG. 11 is a schematic structural diagram of a display device according to an embodiment of the present disclosure.

FIG. 11 is a schematic structural diagram of a display device according to an embodiment of the present disclosure. As shown in FIG. 11, the display device may include a touch IC 10 and the touch display substrate 20 shown in any of FIG. 2 to FIG. 7.

The touch IC 10 may be connected to each of the first control lines Con1, each of the second control lines Con2, the target signal line V1, and each of the touch signal lines Tx in the touch display substrate 20 (not shown in the figure). The touch IC 10 may be configured to provide control signals to the first control lines Con1 and the second control lines Con2, provide a touch modulation signal and a common electrode signal to the target signal line V1, provide common electrode signals to the touch signal lines Tx, and receive touch signals fed back by touch electrodes 02 to the touch signal lines Tx.

Figure 12:
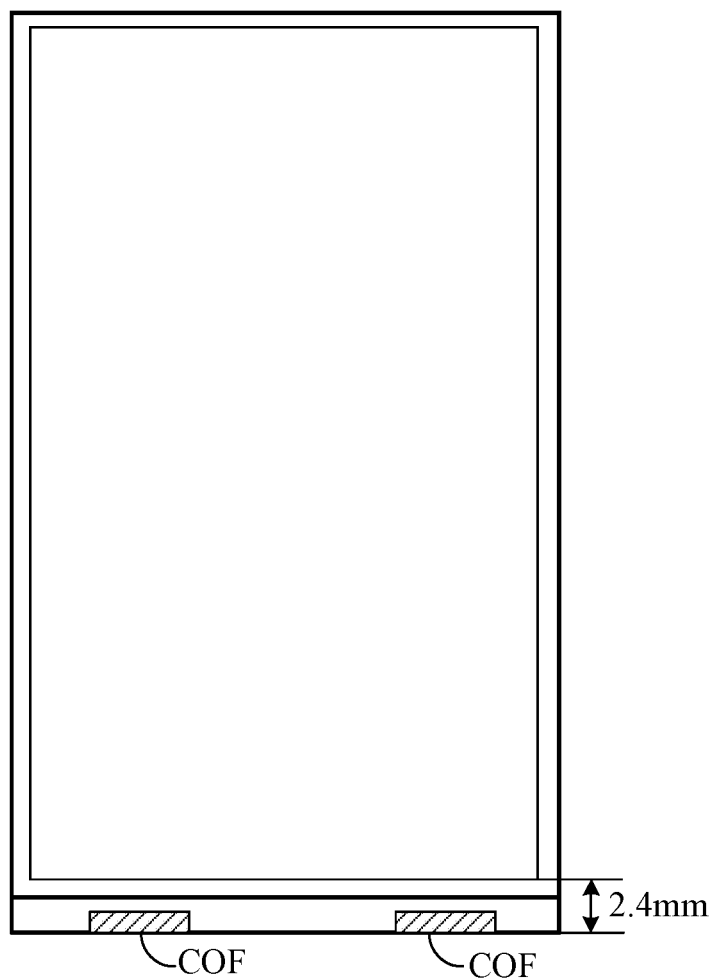
FIG. 12 is a schematic structural diagram of another display device according to an embodiment of the present disclosure.

Optionally, FIG. 12 is a schematic structural diagram of a display device according to an embodiment of the present disclosure, FIG. 13 is a schematic structural diagram of a display device in the related art. As can be seen with reference to FIG. 12 and FIG. 13, the display device may further include a chip on film (COF) and a flexible printed circuit (not shown in the figure). The touch IC may be fixed on the flexible printed circuit by means of the COF. In addition, the display device may include a plurality of COFs.

As can be seen in comparison of FIG. 12 and FIG. 13, the width of the bottom border, provided with the touch IC, of the display device protected in the related art is 3.3 mm; and the width of the bottom border, provided with the touch IC, of the display device in the embodiments of the present disclosure can be reduced to 2.4 mm. Therefore, the border of the display device protected in the embodiments of the present disclosure is narrower. In addition, with reference to the foregoing embodiments, the size of the touch IC in the related art is greater than the size of the touch IC in the embodiments of the present disclosure. Therefore, the number of COFs to be disposed in the embodiments of the present disclosure is less than that in the related art.

Optionally, the display device may be an OLED device, a liquid crystal display (LCD) device, a mobile phone, a tablet computer, a television, a display, a notebook computer, a navigator or any other product or component having a display function.

The descriptions above are merely optional embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A touch display substrate, comprising:
    a base substrate, comprising a display region and a non-display region;
    a plurality of touch electrodes disposed in the display region; and
    a plurality of signal transmission circuits, a plurality of first control lines, a plurality of second control lines, a target signal line, and a plurality of touch signal lines that are disposed in the non-display region;
    wherein each signal transmission circuit is connected to one first control line, one second control line, the target signal line, one touch signal line, and one touch electrode;
    and each signal transmission circuit is configured to control conduction/non-conduction between the touch electrode and the target signal line in response to a control signal provided by the first control line and control conduction/non-conduction between the touch electrode and the touch signal line in response to a control signal provided by the second control line; and
    at least two signal transmission circuits are connected to a same touch signal line, and in the at least two signal transmission circuits connected to the same touch signal line, any two signal transmission circuits are connected to different first control lines and are connected to different second control lines;
    wherein each signal transmission circuit comprises a first signal transmission sub-circuit and a second signal transmission sub-circuit;
    the first signal transmission sub-circuit is connected to the first control line, the target signal line, and the touch electrode, and the first signal transmission sub-circuit is configured to control the conduction/non-conduction between the touch electrode and the target signal line in response to the control signal provided by the first control line; and
    the second signal transmission sub-circuit is connected to the second control line, the touch signal line, and the touch electrode, and the second signal transmission sub-circuit is configured to control the conduction/non-conduction between the touch electrode and the touch signal line in response to the control signal provided by the second control line; and
    wherein the first signal transmission sub-circuit comprises a first signal transmission unit and a second signal transmission unit; and the first control line comprises a first sub-control line and a second sub-control line; wherein
    the first signal transmission unit is connected to the first sub-control line, the target signal line, and one touch electrode, and the first signal transmission unit is configured to control the conduction/non-conduction between the touch electrode and the target signal line in response to a first control signal provided by the first sub-control line; and
    the second signal transmission unit is connected to the second sub-control line, the target signal line, and one touch electrode, and the second signal transmission unit is configured to control the conduction/non-conduction between the touch electrode and the target signal line in response to a second control signal provided by the second sub-control line;
    wherein the first control signal and the second control signal are complementary.

2. The touch display substrate according to claim 1, wherein the first signal transmission unit comprises a first N-type transistor; and the second signal transmission unit comprises a first P-type transistor; wherein
    a gate of the first N-type transistor is connected to the first sub-control line, and a gate of the first P-type transistor is connected to the second sub-control line;

a first electrode of the first N-type transistor and a first electrode of the first P-type transistor are both connected to the target signal line; and a second electrode of the first N-type transistor and a second electrode of the first P-type transistor are both connected to one touch electrode.

3. The touch display substrate according to claim 1, wherein the second signal transmission sub-circuit comprises a third signal transmission unit and a fourth signal transmission unit; and the second control line comprises a third sub-control line and a fourth sub-control line; wherein the third signal transmission unit is connected to the third sub-control line, the touch signal line, and one touch electrode, and the third signal transmission unit is configured to control the conduction/non-conduction between the touch electrode and the touch signal line in response to a third control signal provided by the third sub-control line; and the fourth signal transmission unit is connected to the fourth sub-control line, the touch signal line, and one touch electrode, and the fourth signal transmission unit is configured to control the conduction/non-conduction between the touch electrode and the touch signal line in response to a fourth control signal provided by the fourth sub-control line;

wherein the third control signal and the fourth control signal are complementary.

4. The touch display substrate according to claim 3, wherein the third signal transmission unit comprises a second N-type transistor; and the fourth signal transmission unit comprises a second P-type transistor; wherein a gate of the second N-type transistor is connected to the third sub-control line, and a gate of the second P-type transistor is connected to the fourth sub-control line;

a first electrode of the second N-type transistor and a first electrode of the second P-type transistor are both connected to the touch signal line; and a second electrode of the second N-type transistor and a second electrode of the second P-type transistor are both connected to the touch electrode.

5. The touch display substrate according to claim 2, wherein a width-to-length ratio of the P-type transistor in each signal transmission sub-circuit is greater than a width-to-length ratio threshold.

6. The touch display substrate according to claim 2, wherein the two transistors in each signal transmission sub-circuit are arranged in an extension direction of the connected touch signal line, and a distance between the gates of the two transistors in each signal transmission sub-circuit is greater than a distance threshold.

7. The touch display substrate according to claim 6, wherein in the two transistors in each signal transmission sub-circuit, an orthographic projection of an extension line of a source of one transistor in the extension direction of the touch signal line on the base substrate is not overlapped with an orthographic projection of an extension line of a source of the other transistor in the extension direction of the touch signal line on the base substrate; and in the two transistors in each signal transmission sub-circuit, an orthographic projection of an extension line of a drain of one transistor in the extension direction of the touch signal line on the base substrate is not overlapped with an orthographic projection of an extension line of a drain of the other transistor in the extension direction of the touch signal line on the base substrate.

8. The touch display substrate according to claim 1, wherein two signal transmission circuits are connected to the same touch signal line.

9. The touch display substrate according to claim 1, wherein touch electrodes connected to the at least two signal transmission circuits connected to the same touch signal line are disposed in a same column or a same row.

10. The touch display substrate according to claim 1, wherein the first control lines and the second control lines are extended in a first direction, and the touch signal lines are extended in a second direction, wherein the first direction and the second direction intersect.

11. The touch display substrate according to claim 10, wherein the first direction is perpendicular to the second direction.

12. The touch display substrate according to claim 1, wherein the non-display region and the display region are arranged in an extension direction of the touch signal line.

13. The touch display substrate according to claim 1, wherein a width of the non-display region in an extension direction of the touch signal line is less than a width threshold.

14. The touch display substrate according to claim 4, wherein the first signal transmission unit comprises a first N-type transistor; the second signal transmission unit comprises a first P-type transistor; wherein a gate of the first N-type transistor is connected to the first sub-control line, and a gate of the first P-type transistor is connected to the second sub-control line; a first electrode of the first N-type transistor and a first electrode of the first P-type transistor are both connected to the target signal line; a second electrode of the first N-type transistor and a second electrode of the first P-type transistor are both connected to one touch electrode; wherein a width-to-length ratio of the P-type transistor in each signal transmission sub-circuit is greater than a width-to-length ratio threshold;

the two transistors in each signal transmission sub-circuit are arranged in an extension direction of the connected touch signal line, and a distance between the gates of the two transistors in each signal transmission sub-circuit is greater than a distance threshold;

in the two transistors in each signal transmission sub-circuit, an orthographic projection of an extension line of a source of one transistor in the extension direction of the touch signal line on the base substrate is not overlapped with an orthographic projection of an extension line of a source of the other transistor in the extension direction of the touch signal line on the base substrate; and in the two transistors in each signal transmission sub-circuit, an orthographic projection of an extension line of a drain of one transistor in the extension direction of the touch signal line on the base substrate is not overlapped with an orthographic projection of an extension line of a drain of the other transistor in the extension direction of the touch signal line on the base substrate;

touch electrodes connected to the at least two signal transmission circuits connected to the same touch signal line are disposed in a same column or a same row;

the first control lines and the second control lines are extended in a first direction, the touch signal lines are extended in a second direction, the first direction being perpendicular to the second direction;

the non-display region and the display region are arranged in the extension direction of the touch signal line, and a width of the non-display region in the extension direction of the touch signal line is less than a width threshold; and two signal transmission circuits are connected to the same touch signal line.

15. A method for driving a touch display substrate, comprising:

in a display stage, providing a control signal at an effective potential by each of first control lines and second control lines, and controlling a connected touch electrode and a connected target signal line to be conducted and the connected touch electrode and a connected touch signal line to be conducted by each signal transmission circuit in response to the control signal, wherein the target signal line and the touch signal line output common electrode signals to the touch electrode conducted with the target signal line and the touch signal line; and in an $i^{th}$ touch stage of n touch stages, providing a control signal at an effective potential by a first control line connected to an $i^{th}$ signal transmission circuit in at least two signal transmission circuits connected to each touch signal line, and providing a control signal at ineffective potential by a second control line connected to the $i^{th}$ signal transmission circuit; providing a control signal at the effective potential by a second control line connected to another signal transmission circuit, other than the $i^{th}$ signal transmission circuit, in the at least two signal transmission circuits, and providing a control signal at the ineffective potential by a first control line connected to the another signal transmission circuit; controlling a connected touch electrode and the connected target signal line to be conducted by the $i^{th}$ signal transmission circuit in response to the control signal at the effective potential provided by the first control line, wherein the target signal line outputs a touch modulation signal to the touch electrode conducted with the target signal line; and controlling the connected touch electrode and the connected touch signal line to be conducted by the another signal transmission circuit in response to the control signal at the effective potential provided by the second control line, wherein the touch signal line receives a touch signal fed back by the touch electrode conducted with the touch signal line;

wherein n is a number of the signal transmission circuits connected to each touch signal line, n is an integer greater than 1, and i is a positive integer not greater than n;

wherein each signal transmission circuit comprises a first signal transmission sub-circuit and a second signal transmission sub-circuit;

the first signal transmission sub-circuit is connected to the first control line, the target signal line, and the touch electrode, and the first signal transmission sub-circuit is configured to control the conduction/non-conduction between the touch electrode and the target signal line in response to the control signal provided by the first control line; and the second signal transmission sub-circuit is connected to the second control line, the touch signal line, and the touch electrode, and the second signal transmission sub-circuit is configured to control the conduction/non-conduction between the touch electrode and the touch signal line in response to the control signal provided by the second control line; and wherein the first signal transmission sub-circuit comprises a first signal transmission unit and a second signal transmission unit; and the first control line comprises a first sub-control line and a second sub-control line; wherein the first signal transmission unit is connected to the first sub-control line, the target signal line, and one touch electrode, and the first signal transmission unit is configured to control the conduction/non-conduction between the touch electrode and the target signal line in response to a first control signal provided by the first sub-control line; and the second signal transmission unit is connected to the second sub-control line, the target signal line, and one touch electrode, and the second signal transmission unit is configured to control the conduction/non-conduction between the touch electrode and the target signal line in response to a second control signal provided by the second sub-control line;

wherein the first control signal and the second control signal are complementary.

16. The method according to claim 15, wherein each signal transmission circuit comprises an N-type transistor and a P-type transistor; the first control line comprises a first sub-control line and a second sub-control line; the second control line comprises a third sub-control line and a fourth sub-control line; a gate of the N-type transistor being connected to the first sub-control line or the third sub-control line, and a gate of the P-type transistor being connected to the second sub-control line or the fourth sub-control line;

providing the control signal at the effective potential by the first control line connected to the $i^{th}$ signal transmission circuit and providing the control signal at the ineffective potential by the second control line connected to the $i^{th}$ signal transmission circuit in the $i^{th}$ touch stage comprises:

providing a first control signal at a first potential by the first sub-control line connected to the $i^{th}$ signal transmission circuit, and providing a second control signal at a second potential by the second sub-control line connected to the $i^{th}$ signal transmission circuit; and providing a third control signal at the second potential by the third sub-control line connected to the $i^{th}$ signal transmission circuit, and providing a fourth control signal at the first potential by the fourth sub-control line connected to the $i^{th}$ signal transmission circuit; and providing the control signal at the effective potential by the second control line connected to the another signal transmission circuit, and providing the control signal at the ineffective potential by the first control line connected to the another signal transmission circuit in the $i^{th}$ touch stage comprises:

providing a first control signal at the second potential by the first sub-control line connected to the another signal transmission circuit, and providing a second control signal at the first potential by the second sub-control line connected to the another signal transmission circuit; and providing a third control signal at the first potential by the third sub-control line connected to the another signal transmission circuit, and providing a fourth control signal at the second potential by the fourth sub-control line connected to the another signal transmission circuit;

wherein the first potential is a high potential relative to the second potential.

17. A display device, comprising a touch integrated circuit (IC) and a touch display substrate; wherein
the touch display substrate comprises:
a base substrate, comprising a display region and a non-display region;
a plurality of touch electrodes disposed in the display region; and
a plurality of signal transmission circuits, a plurality of first control lines, a plurality of second control lines, a target signal line, and a plurality of touch signal lines that are disposed in the non-display region;
wherein each signal transmission circuit is connected to one first control line, one second control line, the target signal line, one touch signal line, and one touch electrode;
and each signal transmission circuit is configured to control conduction/non-conduction between the touch electrode and the target signal line in response to a control signal provided by the first control line and control conduction/non-conduction between the touch electrode and the touch signal line in response to a control signal provided by the second control line; and
at least two signal transmission circuits are connected to a same touch signal line, and in the at least two signal transmission circuits connected to the same touch signal line, any two signal transmission circuits are connected to different first control lines and are connected to different second control lines; and
the touch IC is connected to the first control lines, the second control lines, the target signal line, and the touch signal lines in the touch display substrate, and the touch IC is configured to provide the control signal to the first control lines and the second control lines, provide a touch modulation signal and a common electrode signal to the target signal line, provide the common electrode signal to the touch signal lines, and receive a touch signal fed back by the touch electrode to the touch signal line;
wherein each signal transmission circuit comprises a first signal transmission sub-circuit and a second signal transmission sub-circuit;

the first signal transmission sub-circuit is connected to the first control line, the target signal line, and the touch electrode, and the first signal transmission sub-circuit is configured to control the conduction/non-conduction between the touch electrode and the target signal line in response to the control signal provided by the first control line; and
the second signal transmission sub-circuit is connected to the second control line, the touch signal line, and the touch electrode, and the second signal transmission sub-circuit is configured to control the conduction/non-conduction between the touch electrode and the touch signal line in response to the control signal provided by the second control line; and
wherein the first signal transmission sub-circuit comprises a first signal transmission unit and a second signal transmission unit; and the first control line comprises a first sub-control line and a second sub-control line; wherein
the first signal transmission unit is connected to the first sub-control line, the target signal line, and one touch electrode, and the first signal transmission unit is configured to control the conduction/non-conduction between the touch electrode and the target signal line in response to a first control signal provided by the first sub-control line; and
the second signal transmission unit is connected to the second sub-control line, the target signal line, and one touch electrode, and the second signal transmission unit is configured to control the conduction/non-conduction between the touch electrode and the target signal line in response to a second control signal provided by the second sub-control line;
wherein the first control signal and the second control signal are complementary.

18. The display device according to claim 17, further comprising: a chip on film (COF) and a flexible printed circuit; wherein
the touch IC is fixed on the flexible circuit board by means of the COF.

* * * * *